United States Patent
Tsai

(10) Patent No.: US 12,547,537 B2
(45) Date of Patent: Feb. 10, 2026

(54) METHOD AND NON-TRANSITORY COMPUTER-READABLE STORAGE MEDIUM AND APPARATUS FOR UPDATING HOST-ADDRESS TO FLASH-ADDRESS MAPPING TABLE

(71) Applicant: Silicon Motion, Inc., Zhubei (TW)

(72) Inventor: Cheng-Yu Tsai, Kaohsiung (TW)

(73) Assignee: SILICON MOTION, INC., Zhubei (TW)

( * ) Notice: Subject to any disclaimer, the term of this patent is extended or adjusted under 35 U.S.C. 154(b) by 0 days.

(21) Appl. No.: 18/654,217

(22) Filed: May 3, 2024

(65) Prior Publication Data

US 2025/0298739 A1   Sep. 25, 2025

(30) Foreign Application Priority Data

Mar. 19, 2024   (CN) .......................... 202410310979.6

(51) Int. Cl.
*G06F 12/00* (2006.01)
*G06F 12/02* (2006.01)

(52) U.S. Cl.
CPC .. *G06F 12/0246* (2013.01); *G06F 2212/7201* (2013.01)

(58) Field of Classification Search
CPC ..................... G06F 12/0246; G06F 2212/7201
USPC ....................................................... 711/103
See application file for complete search history.

(56) References Cited

U.S. PATENT DOCUMENTS

2020/0401530 A1* 12/2020 Abulila ................. G06F 12/124
2023/0342052 A1* 10/2023 Chen ....................... G06F 3/064

FOREIGN PATENT DOCUMENTS

CN          116149540 A   *  5/2023  ......... G06F 12/1009
TW              811130 B1  *  1/2023

* cited by examiner

*Primary Examiner* — Mardochee Chery
(74) *Attorney, Agent, or Firm* — Birch, Stewart, Kolasch & Birch, LLP

(57) ABSTRACT

The invention introduces a method for updating a host-address to flash-address mapping table, performed by a processing unit, to include: allocating a temporary flash-address to host-address mapping (F2H) region in a random access memory (RAM) for storing an F2H table corresponding to a current block; setting a flushing number according to information whether available space in a flash module is sufficient, or whether a garbage collection (GC) process is performed while the user data is programmed into the flash module; and updating mapping information of host-address to flash-address mapping (H2F) sub-tables according to mapping information in the flushing number of records stored in the temporary F2H region, and programming updated H2F sub-tables into a designated physical address of the flash module in response that the user data has been programmed into a physical address of the current block, which corresponds to a checkpoint.

20 Claims, 15 Drawing Sheets

METHOD AND NON-TRANSITORY COMPUTER-READABLE STORAGE MEDIUM AND APPARATUS FOR UPDATING HOST-ADDRESS TO FLASH-ADDRESS MAPPING TABLE

CROSS-REFERENCE TO RELATED APPLICATIONS

This application claims the benefit of priority to Patent Application No. 202410310979.6, filed in China on Mar. 19, 2024; the entirety of which is incorporated herein by reference for all purposes.

BACKGROUND

The disclosure generally relates to storage devices and, more particularly, to a method, a non-transitory computer-readable storage medium and an apparatus for updating a host-address to flash-address mapping table.

Flash memory devices typically include NOR flash devices and NAND flash devices. NOR flash devices are random access—a host side accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the host side has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. Efficient execution of host write commands has always been an important issue for NAND flash devices.

SUMMARY

In an aspect of the invention, an embodiment introduces a method for updating a host-address to flash-address mapping table, performed by a processing unit, to include the following steps: allocating a temporary flash-address to host-address mapping (F2H) region in a random access memory (RAM) for storing an F2H table corresponding to a current block; setting a flushing number according to information whether available space in a flash module is sufficient, or whether a garbage collection (GC) process is performed while the user data is programmed into the flash module; and updating mapping information of host-address to flash-address mapping (H2F) sub-tables according to mapping information in the flushing number of records stored in the temporary F2H region, and programming updated H2F sub-tables into a designated physical address of the flash module in response that the user data has been programmed into a second physical address of the current block, which corresponds to a checkpoint.

In another aspect of the invention, an embodiment introduces a non-transitory computer-readable storage medium having stored therein program code that, when loaded and executed by a processing unit, causes the processing unit to perform the method for updating a host-address to flash-address mapping table as described above.

In still another aspect of the invention, an embodiment introduces an apparatus for updating a host-address to flash-address mapping table, to include: a RAM; a flash interface (I/F), coupled to a flash module; and a processing unit, coupled to the RAM and the flash I/F. The RAM is arranged operably to allocate a temporary F2H region for storing an F2H table corresponding to a current block. The processing unit is arranged operably to: set a flushing number according to information whether available space in the flash module is sufficient, or whether a GC process is performed while the user data is programmed into the flash module; and update mapping information of multiple H2F sub-tables according to mapping information in the flushing number of records stored in the temporary F2H region, and program updated H2F sub-tables into a designated physical address of the flash module in response that the user data has been programmed into a second physical address of the current block, which corresponds to a checkpoint.

The F2H table includes multiple records arranged in an order of first physical addresses of the current block, and each record stores information indicating which logical address of user data that is mapped by a specific first physical address of the current block.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Certain aspects and embodiments of this disclosure are provided below. Some of these embodiments may be applied independently and some of them may be applied in conjunction as would be apparent to those of skill in the art. In the following description, for the purposes of explanation, specific details are set forth in order to provide a thorough understanding of aspects of the application. However, it will be apparent that various embodiments may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that changes may be made in the function and arrangement of elements without departing from the spirit and scope of the application as set forth in the claims.

Figure 1:
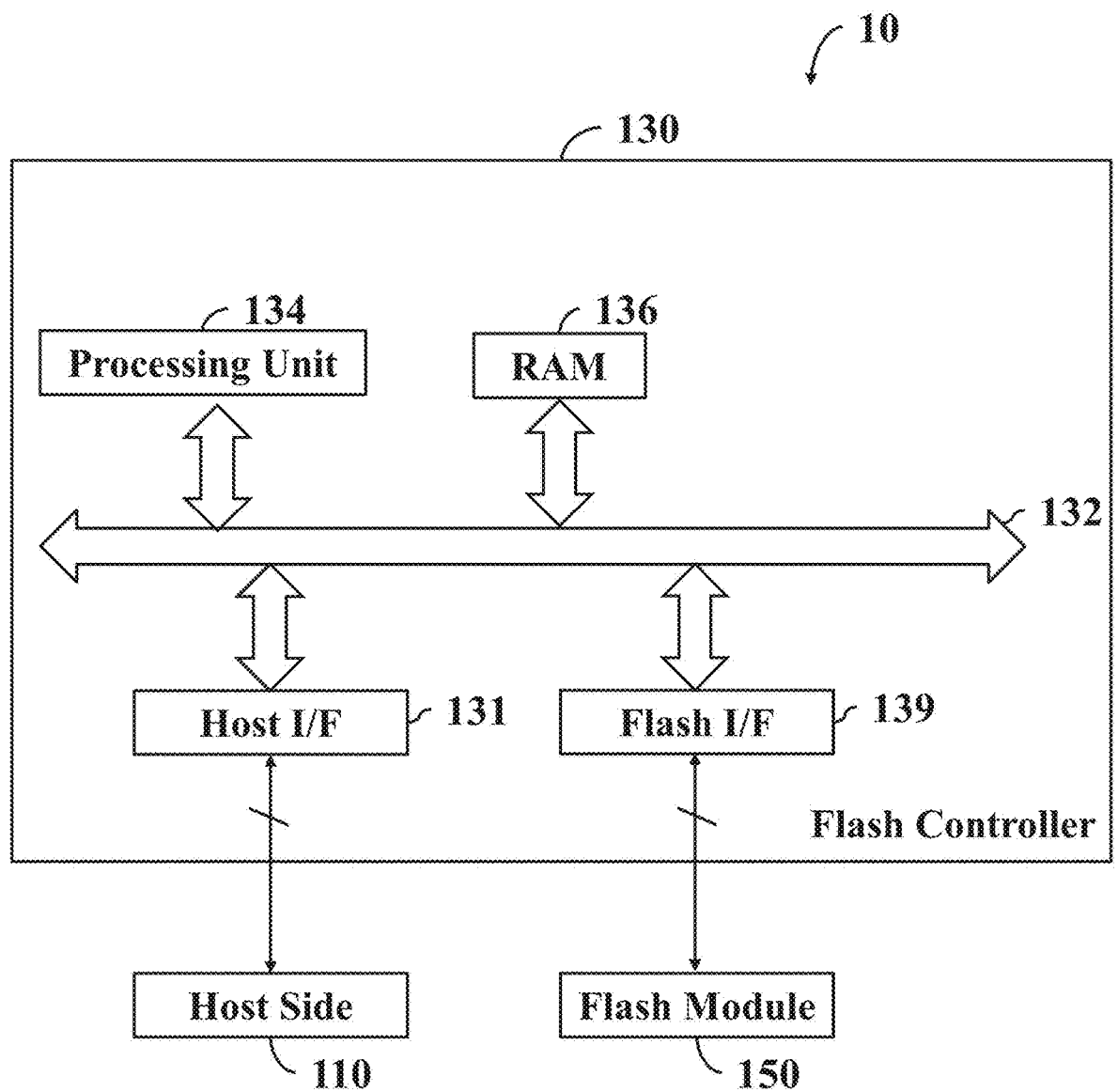
FIG. 1 is the system architecture of an electronic apparatus according to an embodiment of the invention.

Refer to FIG. 1. The electronic apparatus 10 includes the host side 110, the flash controller 130 and the flash module 150, and the flash controller 130 and the flash module 150 may be collectively referred to as a device side. The electronic apparatus 10 may be equipped with an external storage device, a Personal Computer (PC), a laptop PC, a tablet PC, a mobile phone, a digital camera, a digital recorder, a smart television, a smart freezer, an automotive electronics system or other consumer electronic products. The host side 110 and the host interface (I/F) 131 of the flash controller 130 may communicate with each other by Universal Serial Bus (USB), Advanced Technology Attachment (ATA), Serial Advanced Technology Attachment (SATA), Peripheral Component Interconnect Express (PCI-E), Universal Flash Storage (UFS), Embedded Multi-Media Card (eMMC) protocol, or others. The flash I/F 139 of the flash controller 130 and the flash module 150 may communicate with each other by a Double Data Rate (DDR) protocol, such as Open NAND Flash Interface (ONFI), DDR Toggle, or others. The flash controller 130 includes the processing unit 134 and the processing unit 134 may be implemented in numerous ways, such as with general-purpose hardware (e.g., a microcontroller unit, a single processor, multiple processors or graphics processing units capable of parallel computations, or others) that is programmed using firmware and/or software instructions to perform the functions recited herein. The processing unit 134 may receive host commands from the host side 110 through the host interface (I/F) 131, such as write commands, read commands, discard commands, erase commands, etc., schedule and execute the host commands. The flash controller 130 includes the Random Access Memory (RAM) 136, which may be implemented in a Dynamic Random Access Memory (DRAM), a Static Random Access Memory (SRAM), or the combination thereof, for allocating space as a data buffer storing user data (also referred to as host data) that has been obtained from the host side 110 and is to be programmed into the flash module 150, and that has been read from the flash module 150 and is to be output to the host side 110. The RAM 136 stores necessary data in execution, such as variables, data tables, data abstracts, host-address to flash-address mapping (H2F) tables, flash-address to host-address mapping (F2H) tables, or others. The flash I/F 139 includes a NAND flash controller (NFC) to provide functions that are required to access to the flash module 150, such as a command sequencer, a Low Density Parity Check (LDPC) encoder/decoder, etc.

The flash controller 130 may be equipped with the bus architecture 132 to couple components to each other to transmit data, addresses, control signals, etc. The components include but not limited to the host I/F 131, the processing unit 134, the RAM 136 and the flash I/F 139. A direct memory access (DMA) circuitry of a component moves data between specific components through the bus architecture 132 according to instructions or control signals. For example, a DMA circuitry of the host I/F 131 or the flash I/F 139 may migrate data in a specific data buffer thereof to a specific address of the RAM 136, migrate data in a specific address of the RAM 136 to a specific data buffer thereof, and so on.

The flash module 150 provides huge storage space typically in hundred Gigabytes (GBs), or even several Terabytes (TBs), for storing a wide range of user data, such as high-resolution images, video files, etc. The flash module 150 includes control circuitries and memory arrays containing memory cells, such as being configured as Single Level Cells (SLCs), Multi-Level Cells (MLCs), Triple Level Cells (TLCs), Quad-Level Cells (QLCs), or any combinations thereof. The processing unit 134 programs user data into a designated address (a destination address) of the flash module 150 and reads user data from a designated address (a source address) thereof through the flash I/F 139. The flash I/F 139 may use several electronic signals including a data line, a clock signal line and control signal lines for coordinating the command, address and data transfer with the flash module 150. The data line may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc.

Figure 2:
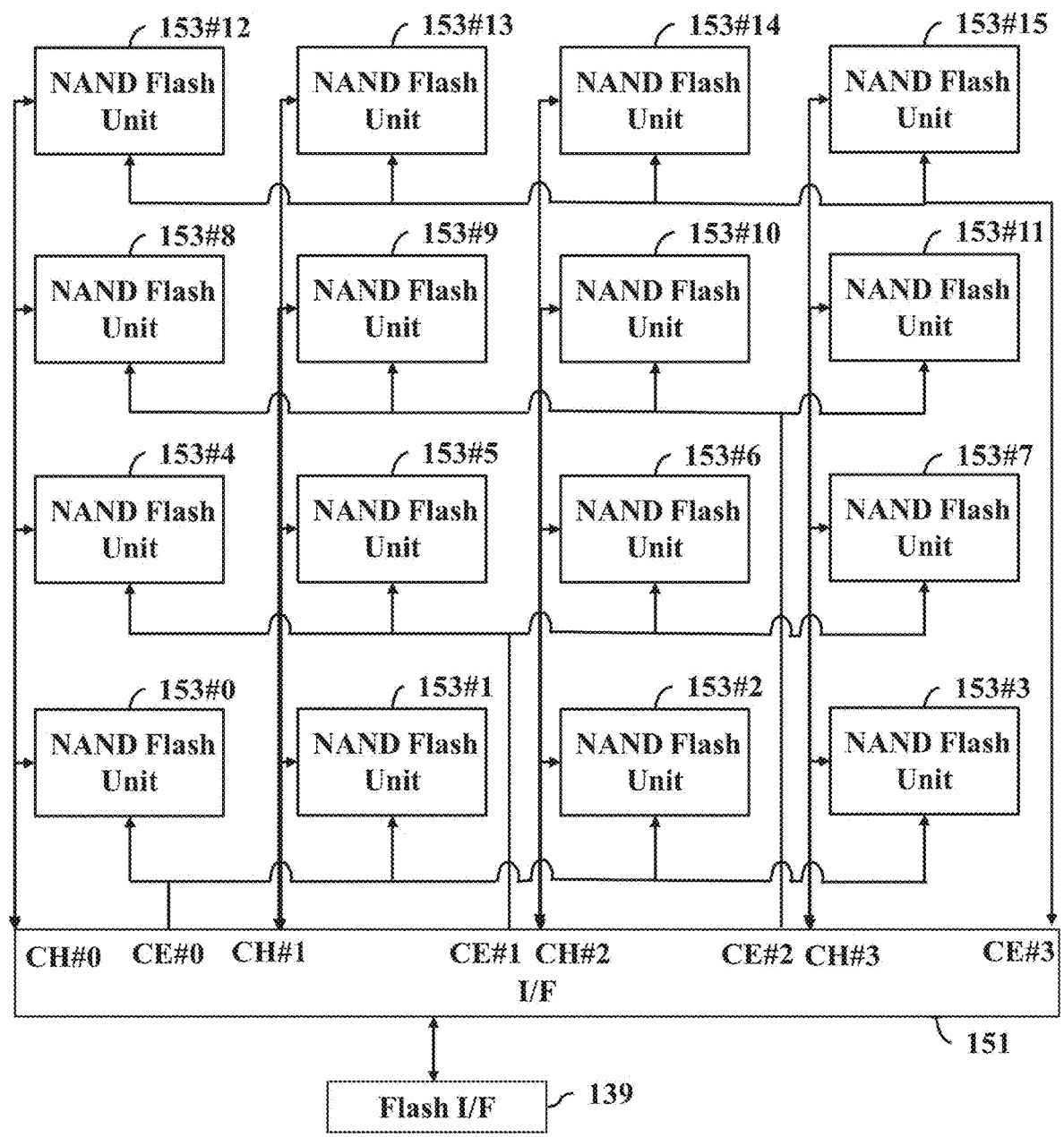
FIG. 2 is a schematic diagram illustrating a flash module according to an embodiment of the invention.

Refer to FIG. 2. The I/F 151 of the flash module 150 may include four I/O channels (hereinafter referred to as channels) CH #0 to CH #3 and each is connected to four NAND flash units, for example, the channel CH #0 is connected to the NAND flash units 150 #0, 150 #4, 150 #8 and 150 #12. Each NAND flash unit can be packaged in an independent die. The flash I/F 139 may issue one of the CE signals CE #0 to CE #3 through the I/F 151 to activate the NAND flash units 153 #0 to 153 #3, the NAND flash units 153 #4 to 153 #7, the NAND flash units 153 #8 to 153 #11, or the NAND flash units 153 #12 to 153 #15, and read data from or program data into the activated NAND flash units in parallel.

Figure 3:
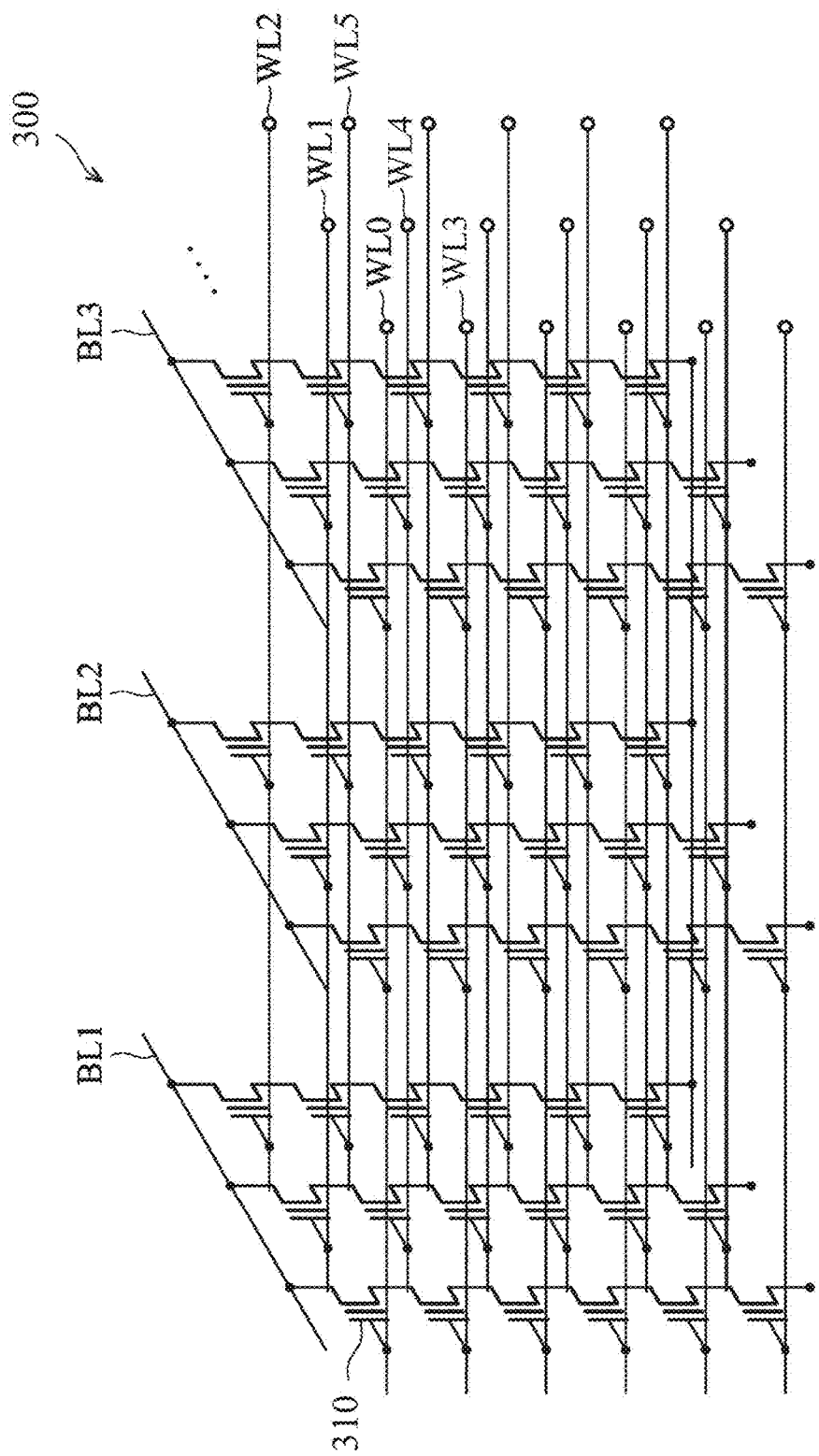
FIG. 3 is a schematic diagram showing the hardware architecture of a portion of a NAND flash unit according to an embodiment of the invention.

Refer to FIG. 3 showing the hardware architecture of a portion of a NAND flash unit. Each NAND flash unit may contain a plurality of memory blocks (e.g. the memory block 300) and the memory block 300 contains multiple memory cells, such as floating gate transistors (e.g. the floating gate transistor 310), or other charge trap devices. The structure of the memory block 300 includes bit lines and word lines. For brevity, only the bit lines BL1 to BL3 and the word lines WL0 to WL5 are labeled in FIG. 3. For example, the floating gate transistors on the word lines WL0 to WL2 and WL3 to WL5 form different pages for storing data.

Each NAND flash unit may include multiple data planes, each data plane may include multiple physical blocks. In order to improve the data programming and data reading efficiency, designated physical pages of multiple data planes across multiple NAND flash units are organized into one super page (SP). For example, in the exemplary configuration as shown in FIG. 2, each NAND flash unit includes four data planes, and each data plane includes at least one physical page of four kilobytes (KB). One SP stores user data of 256 KB (=4 channels×4 CE×4 data planes×4 KB). One super block (SB) is composed of multiple SPs. In some embodiments, any SB may be configured as a Single Level Cell (SLB) SB and each SP in the SLC SB is called SLC SP. In alternative embodiments, any SB may be configured as a Multi-Level Cell (MLC) SB and each SP in the MLC SB may be a most significant bit (MSB) SP or a least significant bit (LSB) SP. In still alternative embodiments, any SB may be configured as a Triple Level Cell (TLC) SB and each SP in the TLC SB may be an MSB SP, a center significant bit (CSB) SP or an LSB SP. In still alternative embodiments, any SB may be configured as a Quad-Level Cell (QLC) SB and each SP in the QLC SB may be a top significant bit (TSB) SP, an MSB SP, a CSB SP or an LSB SP.

In some embodiments, one logical block address (LBA) managed by the host side 110 may represent user data of 512 bytes (B), and each physical page may be divided into eight sections in 512 B. An LBA number is referred to as a logical address managed by the host side 110. An SB, a physical page and a section may be identified by a super-block number, a physical page number and a section number, respectively, and the combination of the numbers is referred to as a physical address of the flash module 150. In alternative embodiments, one host page number managed by the host side 110 may represent user data of 4 KB and each physical page is not necessary to divide into sections. A host page number is referred to as a logical address managed by the host side 110. An SB and a physical page may be identified by a super-block number and a physical page number, respectively, and the combination of the numbers is referred to as a physical address of the flash module 150.

Each SB is labeled as a data block or a current block according to its function. The processing unit 134 may select an empty SB as the current block for preparing to program user data received from the host side 110. The processing unit 134 maintains the F2H table for each current block. Each F2H table contains multiple records. Each record stores information indicating which logical address of user data that is associated with (or mapped by) a specific physical page in the current block. The records in the F2H table are stored in the order of the page numbers of physical pages in the current block. The logical address is expressed by a logical block address (LBA), a host page number or other expression and is managed by the host side 110. The processing unit 134 may drive the flash I/F 139 to program the corresponding F2H table in the RAM 136 into the data region of the designated physical page of one current block after all physical pages of this current block are fully stored in user data, or the remaining physical pages of this current block are filled with dummy values. For example, one current block may be divided into multiple banks, and the records of the F2H table corresponding to one bank of the current block are programmed into the last physical page of this bank. The current block is changed to the data block after all records of the corresponding F2H table have been programmed into the flash module 150, and the user data stored in the data block cannot be modified. Subsequently, the processing unit 134 selects an empty SB as a new current block.

Figure 4:
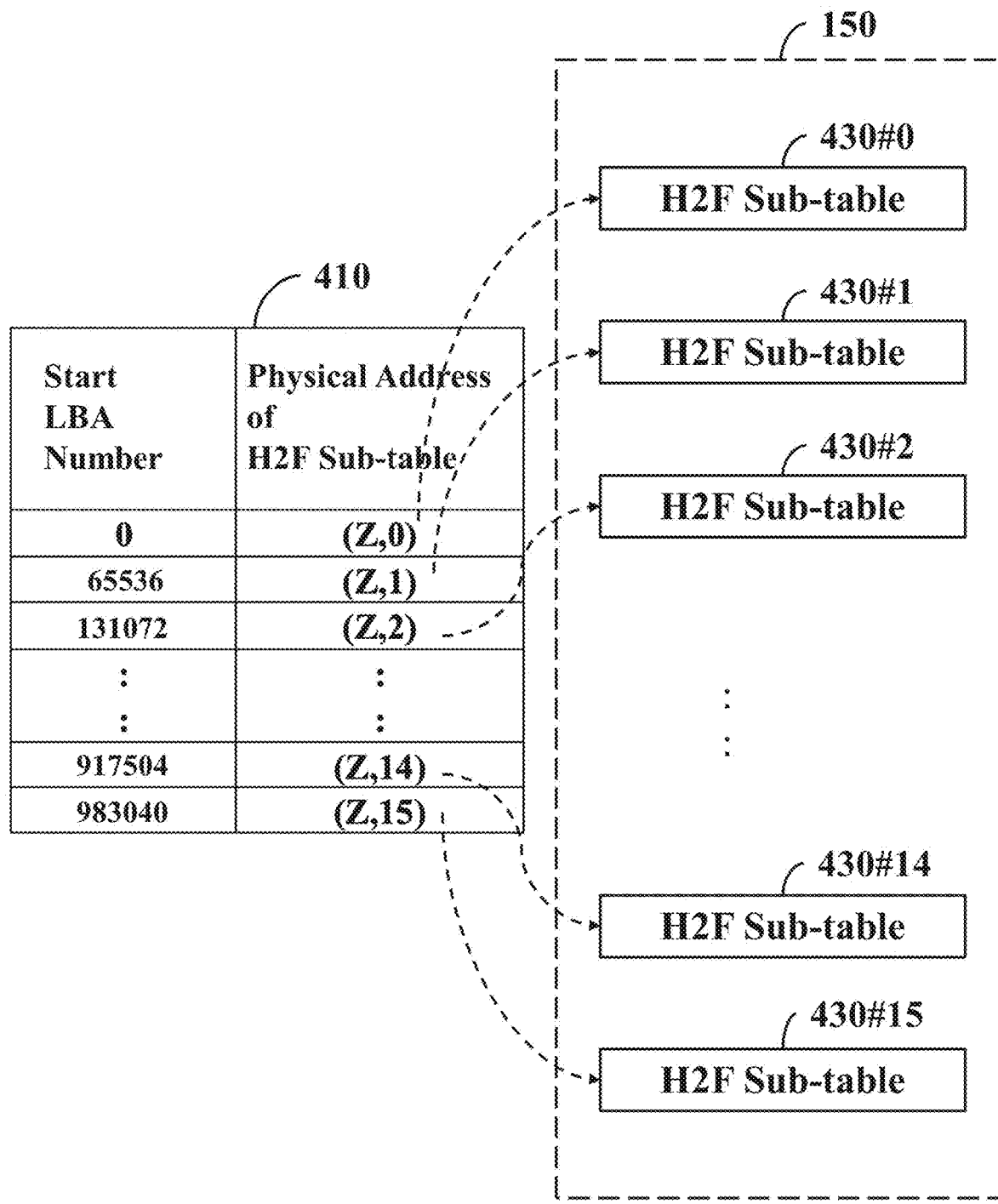
FIG. 4 is a schematic diagram showing the relationships between the high-level mapping table and the host-address to flash-address mapping (H2F) sub-tables according to an embodiment of the invention.

In addition to programming the F2H table into the designated physical page of the current block, the processing unit 134 updates the H2F table according to the content of F2H table, so that the processing unit 134 when executing host read commands searches the H2F table for the physical addresses user data of particular logical addresses are physically stored in later. The H2F table contains multiple records arranged in the order of the logical addresses, and each record stores information indicating which physical address user data of the corresponding logical address is physically stored in. However, because the RAM 136 cannot provide enough space to store the whole H2F table for the processing unit 134, the whole H2F table is divided into multiple H2F sub-tables and the H2F sub-tables are stored in the flash module 150, so that only necessary H2F sub-table or sub-tables are read from the flash module 150 and stored in the RAM 136 for fast look-up when data read operations are performed in the future. Referring to FIG. 4. The whole H2F table is divided into H2F sub-tables 430 #0~430 #15. The processing unit 134 further maintains the high-level mapping table 410, which contains multiple records arranged in the order of the logical addresses. Each record stores information indicating which physical address the corresponding H2F sub-table for a designated logical address range is physically stored in. For example, the H2F sub-table 430 #0 associated with the LBA #0 to LBA #65535 is stored in the $0^{th}$ physical page of a designated SB (the letter "Z" represents the number of the designated SB), the H2F sub-table 430 #1 associated with the LBA #65536 to the LBA #131071 is stored in the $1^{st}$ physical page of the designated SB, and the remaining can be deduced by analogy. Although FIG. 4 shows 16 H2F sub-tables only, those artisans may modify the design to put more or less H2F sub-tables depending on the capacity of the flash module 150, and the invention should not be limited thereto.

Figure 5:
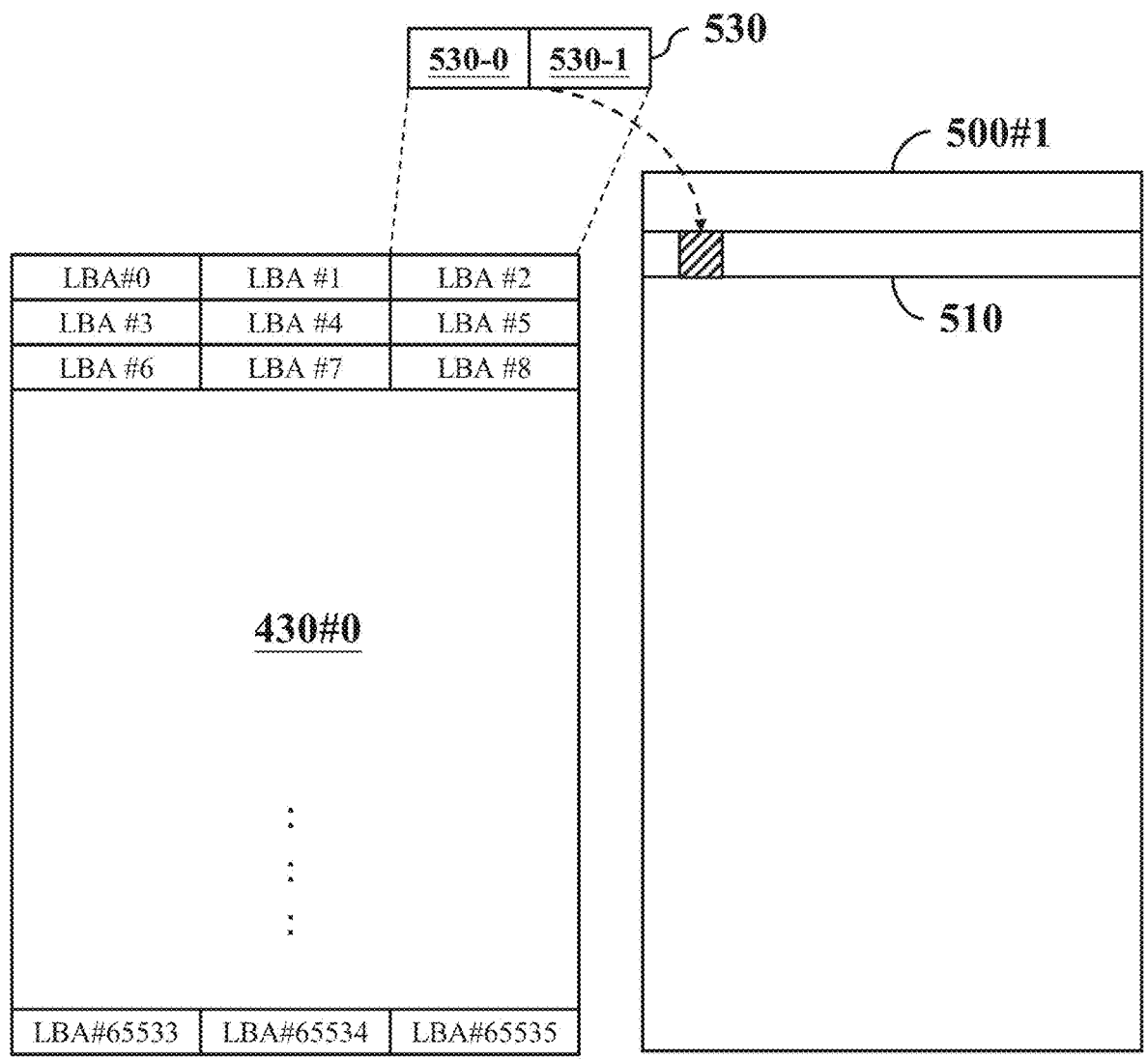
FIG. 5 is a schematic diagram showing the relationships between the H2F sub-table and the physical page according to an embodiment of the invention.

Space required by each H2F sub-table may be 16 KB, 32 KB, 64 KB, 128 KB, or others. Refer to FIG. 5. For example, the H2F sub-table stores physical-address information mapped by each logical address in the order of the logical addresses in one logical address range. Each logical address may be represented by an LBA number and each LBA number relates to a fixed physical storage-space, such as 512 B. Those skilled in the art may use a host page number to represent a logical address and the invention should not be limited thereto. For example, the H2F sub-table 430 #0 stores the physical-address information of LBA #0 to LBA #65535 sequentially. The Physical-address information 530 may be represented in four bytes: the two most-significant bytes 530-0 records a SB number and the two least-significant bytes 530-1 records a physical page number and a section number. For example, the physical-address information 530 corresponding to LBA #2 points to the section (as shown in the rectangle filled with slashes) of the physical page 510 of the SB 500 #1. The bytes 530-0 records the number of the SB 500 #1, and the bytes 530-1 records the number of the physical page 510 and the number of the designated section.

Figure 6:
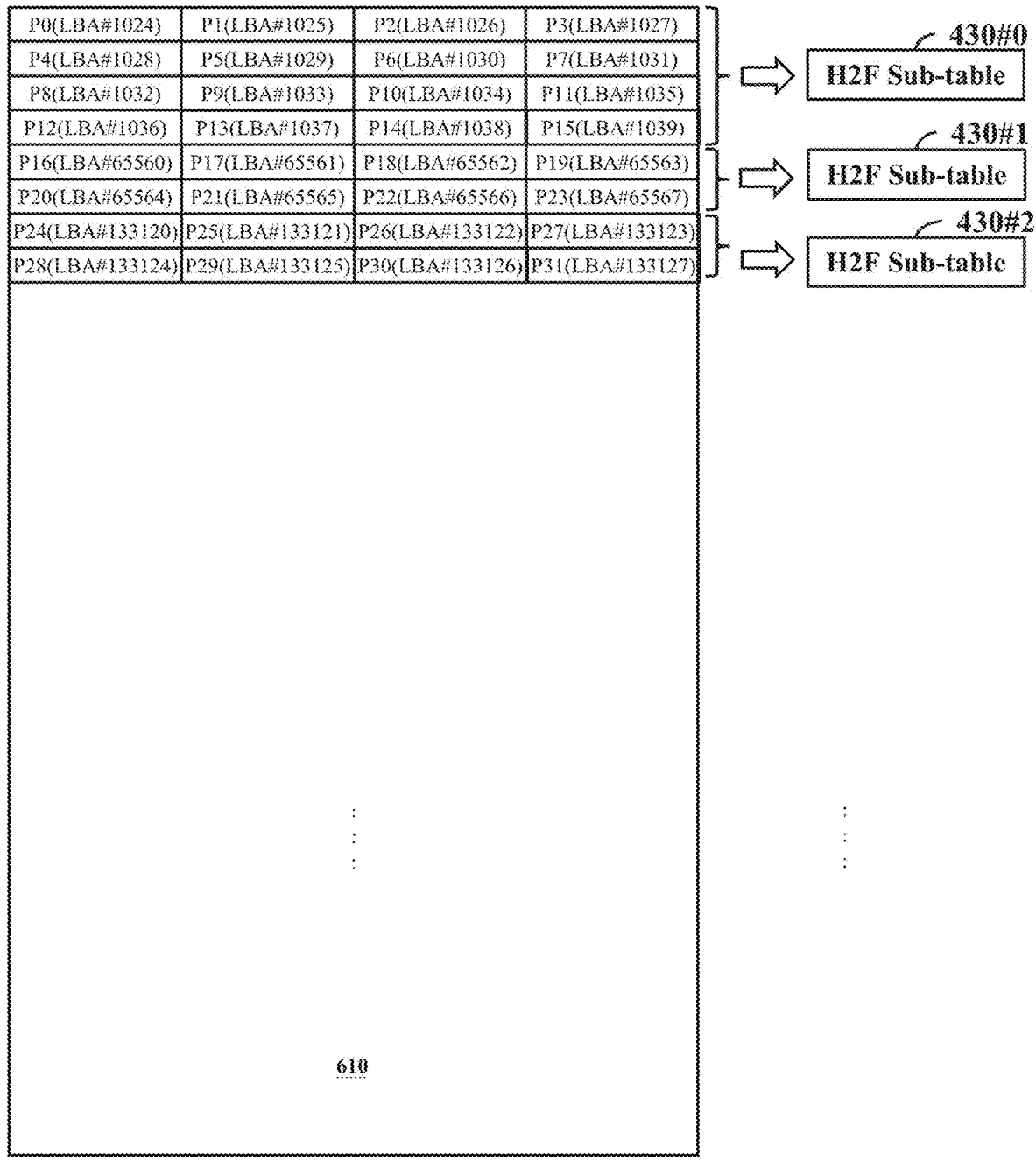
FIG. 6 is a schematic diagram for flushing H2F sub-tables with references made to mapping information in the F2H table according to an embodiment of the invention.

The flash controller 130 periodically performs a H2F-table flushing procedure to read relevant H2F sub-tables from the flash module 150 and update the mapping information in these H2F sub-tables according to the mapping information of the F2H table, and program the updated results into the flash module 150 during the execution of host write commands for programming user data into the flash module 150 through the flash I/F 139. The H2F-table flushing procedure avoids the consumption of excessive computation resources for rebuilding the H2F sub-tables for the user data that has been programmed into the flash module 150 in the sudden power off recovery (SPOR) procedure, resulting from most of the H2F sub-tables haven't been programmed into the non-volatile flash module 150 when a sudden power off (SPO) occurs. For example, refer to FIG. 6 showing a schematic diagram for flushing H2F sub-tables according to mapping information in the F2H table. Since the RAM 136 is a scarce resource, the RAM 136 only allocates a fixed space smaller than one SB to store a portion of the F2H table 610. The F2H table 610 in the RAM 136 stores the following information: The physical addresses P0 to P15 of the flash module 150 stores the user data of the logical addresses LBA #1024 to LBA #1039, respectively; the physical addresses P16 to P23 of the flash module 150 stores the user data of the logical addresses LBA #65560 to LBA #65567, respectively; and the physical addresses P24 to P31 of the flash module 150 stores the user data of the logical addresses LBA #133120 to LBA #133127, respectively. In the H2F-table flushing procedure, the processing unit 134 updates the mapping information related to the logical addresses LBA #1024 to LBA #1039 in the H2F sub-table 430 #0 according to the mapping information related to the physical addresses P0 to P15 in the F2H table 610; updates the mapping information related to the logical addresses LBA #65560 to LBA #65567 in the H2F sub-table 430 #1 according to the mapping information related to the physical addresses P16 to P23 in the F2H table 610; updates the mapping information related to the logical addresses LBA #133120 to LBA #133127 in the H2F sub-table 430 #2 according to the mapping information related to the physical addresses P24 to P31 in the F2H table 610; and programs the updated H2F sub-tables 430 #0, 430 #1 and 430 #2 into a designated physical address of the flash module 150.

The H2F-table flushing procedure as described above requires to consume computation resources of the processing unit 134 and the RAM 136, and the bandwidth of the flash I/F 139. If the execution frequency of the H2F-table flushing procedure is too high, the execution performance of host write commands would be dropped. If the execution frequency of the H2F-table flushing procedure is too low, it would spend more computation resources to rebuild H2F sub-tables in a future SPOR procedure in response of an SPO. The processing unit 134 may control the flushing number of records of the F2H table in the H2F-table flushing procedure to adjust the execution frequency of the H2F-table flushing procedure. However, in some implementations, the flushing number of records of the F2H table in the H2F-table flushing procedure is fixed, and cannot be modified based on the actual storage status of the flash module 150.

Fixed space of the RAM 136 (also referred to as the temporary F2H region) is allocated for storing multiple records in the F2H table. In some embodiments, the allocated space is sufficient to store all records of the F2H table. In alternative embodiments, the allocated space is insufficient to store all records of the F2H table, for example, store ⅓, ¼ or ⅕ records of the F2H table only. To reflect the actual storage status of the flash module 150, an embodiment of the invention proposes an adjustment mechanism for controlling the flushing number of records of the F2H table in the H2F-table flushing procedure according to information whether the available space in the flash module 150 is sufficient, or whether a garbage collection (GC) process is performed while user data is programmed into the flash module 150. The H2F-table flushing procedure updates the relevant H2F sub-tables with references made to the mapping information in the flushing number of records of the F2H table. The flushing number of records of the F2H table is set to a total number of records of the F2H table corresponding to n SPs in response that the available space in the flash module 150 is insufficient (for example, there are less than 30 empty SBs left in the flash module 150), or the GC process needs to be performed while user data is programmed into the flash module 150, where n is a constant set to any integer ranging from 2 to 4. For example, the constant n is set to 2, 3 or 4 when the current block is an SLC SB. The constant n is set to 2 or 4 when the current block is an MLC SB. The constant n is set to 3 when the current block is an TLC SB. The constant n is set to 4 when the current block is an QLC SB. The flushing number of records of the F2H table is set to a total number of records of the F2H table corresponding to m×n SPs in response that the available space in the flash module 150 is sufficient (for example, there are 30 empty SBs or more left in the flash module 150), or the GC process is not performed while user data is programmed into the flash module 150, where m is a constant set to any integer ranging from 32 to 128. It is to be understood that the flushing number of records of the F2H table indirectly affects the execution timing of the next iteration in the H2F-table flushing procedure. The mapping information of relevant H2F sub-tables is updated according to the mapping information of the flushing number of records stored in the temporary F2H region, and the updated H2F sub-tables are programmed into a designated address of the flash module 150 through the flash I/F 139 after user data is programmed into the physical address of the current block, which corresponds to a checkpoint.

Figure 7:
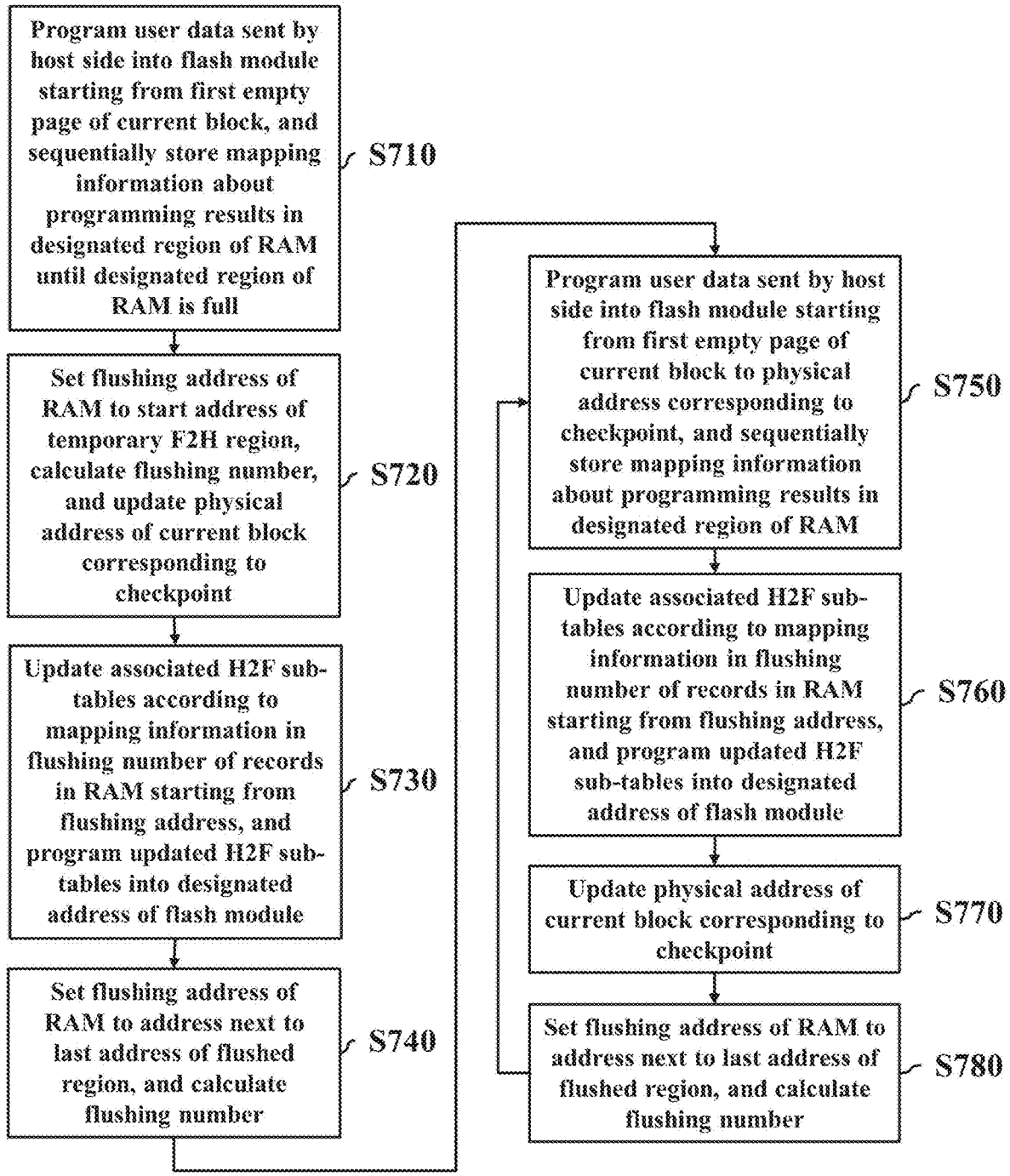
FIG. 7 is a flowchart illustrating a method for updating the H2F table according to an embodiment of the invention.
Figure 8A:
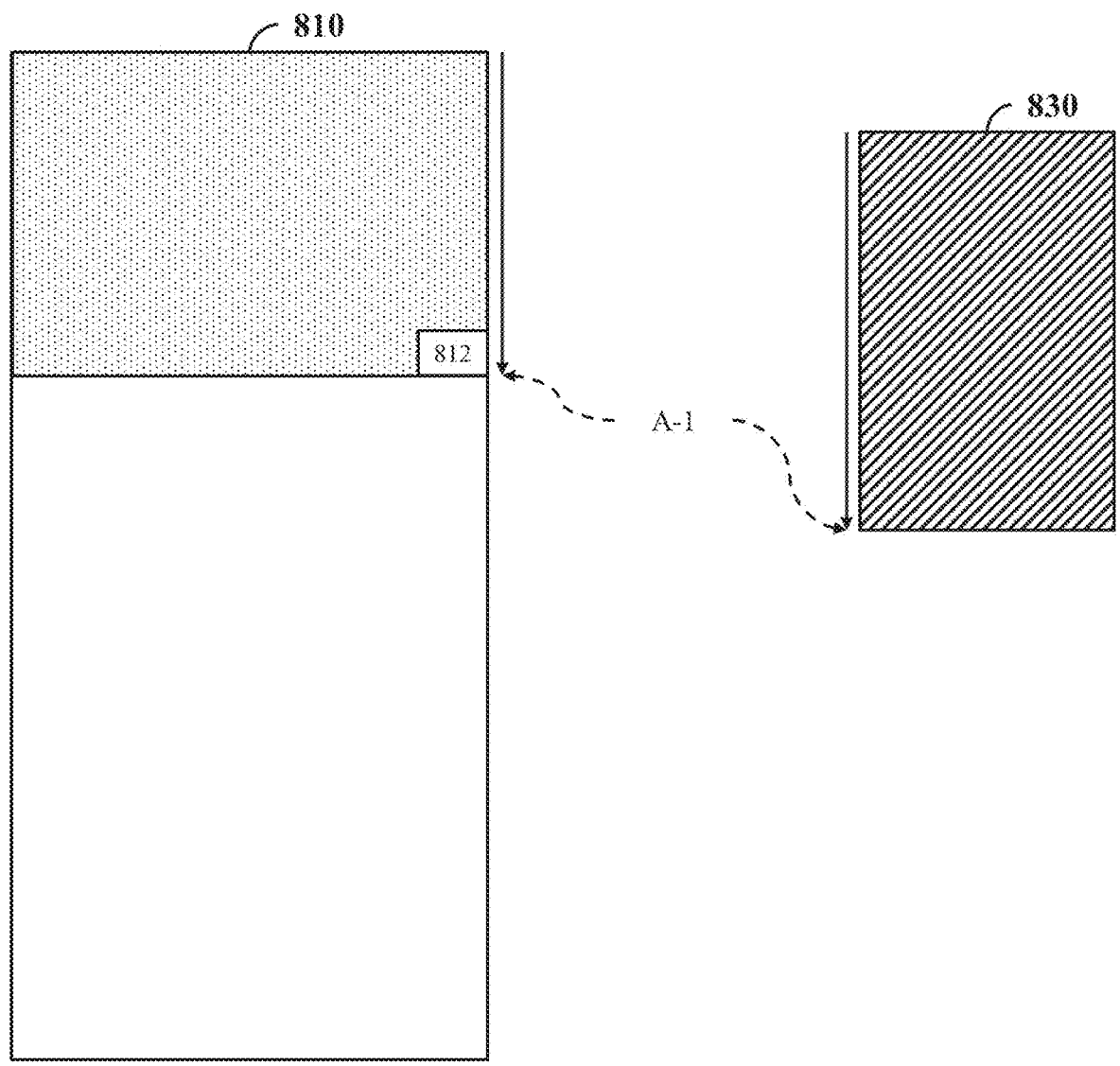
FIGS. 8A and 8H are schematic diagrams for updating the H2F sub-tables in accordance with mapping information in the temporary flash-address to host-address mapping (F2H) region according to an embodiment of the invention.

The processing unit 134 when loading and executing program code of Firmware Translation Layer (FTL) realizes a method for updating the H2F table, as shown in FIG. 7. The method includes a repeatedly executed loop. Details are described as follows:

Step S710: User data sent by the host side 110 is programmed through the flash I/F 139 into the flash module 150 starting from the first empty page of the current block, and the mapping information about the programming results are sequentially stored in the designated region of the RAM 136 until the designated region of the RAM 136 is full. For example, one SP stores user data of 512 LBAs, and fixed 256 KB of the RAM 136 (may be referred to as the temporary F2H region) is allocated for storing the F2H table temporarily. Suppose that each record in the F2H table uses 4B to record mapping information (that is, a LBA number mapped by a designated physical address), the space of the temporary F2H region stores 65536 records of the F2H table. The processing unit 134 fills the temporary F2H region of the RAM 136 is with mapping information fully after programming user data of 65536 LBAs into the flash module 150 through the flash I/F 139. As indicated by the notation A-1 in FIG. 8A, the temporary F2H region 830 is filled with mapping information of 65536 records after user data is programmed into the SB 810 starting from the first physical address to the physical address 812. The region filled with dots in the SB 810 represents the region where user data has been programmed, and the blank region in the SB 810 represents the region where user data hasn't been programmed. The temporary F2H region 830 filled with slashes represents the region where the mapping information is stored. Since the temporary F2H region 830 is full, it needs to flush relevant H2F sub-tables in accordance with mapping information of a portion of records in the temporary F2H region 830 and release space of the temporary F2H region 830 storing the portion of records in the subsequent steps, so that the subsequent records of the F2H table can be stored in the released space.

Step S720: The flushing address of the RAM 136 is set to the start address of the temporary F2H region, the flushing number is calculated, and the physical address of the current block corresponding to the next checkpoint is updated. For example, the flushing number is set to a total number of records of the F2H table corresponding to n SPs if the available space in the flash module 150 is insufficient, or if the GC process needs to be performed while user data is programmed into the flash module 150, where n is a constant set to any integer ranging from 2 to 4. The flushing number is set to a total number of records of the F2H table corresponding to m×n SPs if the available space in the flash module 150 is sufficient, or if the GC process does not need to perform while user data is programmed into the flash module 150, where m is a constant set to any integer ranging from 32 to 128. The processing unit 134 calculates the physical address for the checkpoint by using the following equation:

$$Addr_{CHK} = Addr_{CHK} + Addr(dChunk)$$

Figure 8B:
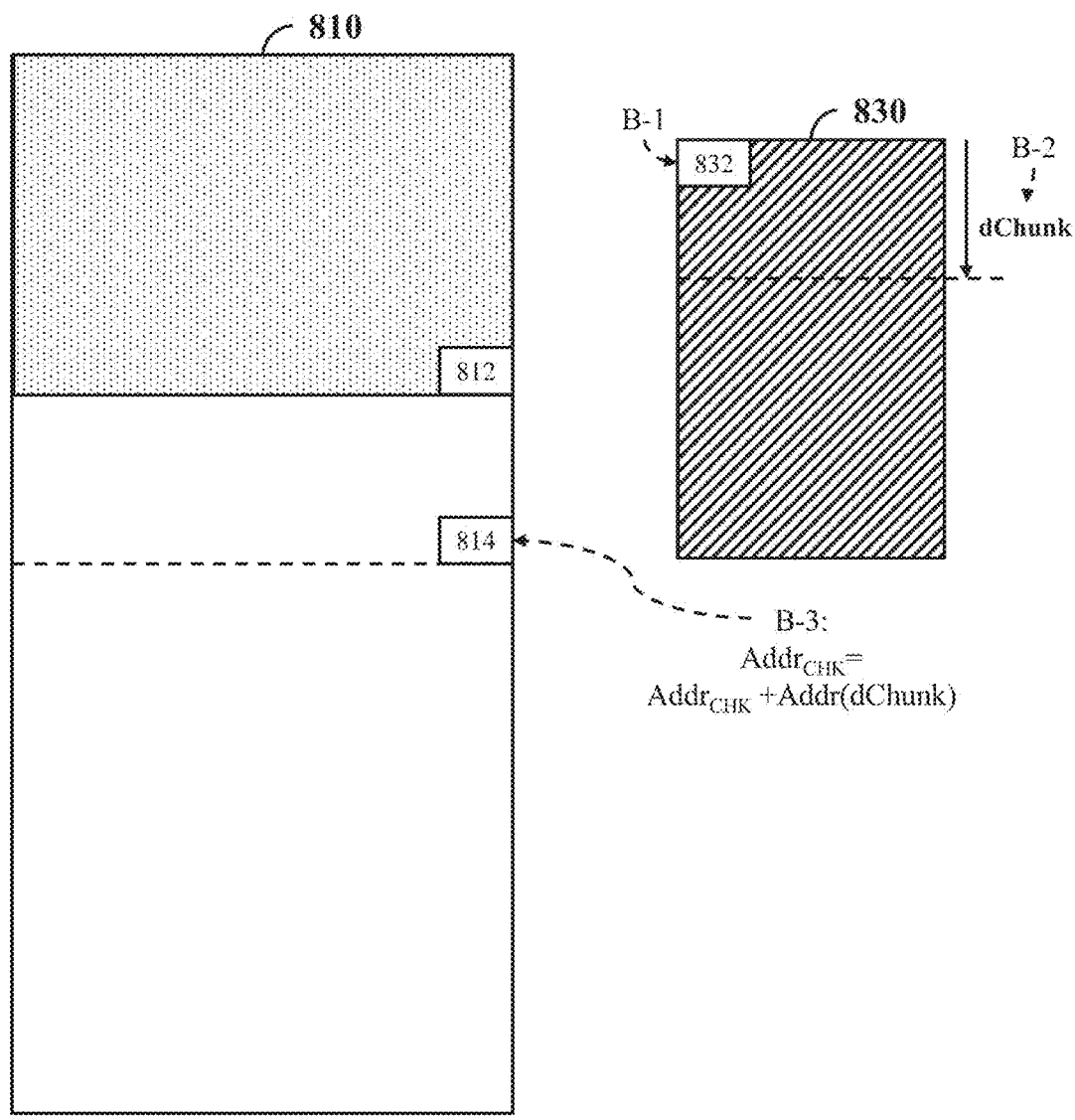

$Addr_{CHK}$ on the left side of the equal sign represents the physical address of the current block corresponding to the checkpoint, $Addr_{CHK}$ on the right side of the equal sign represents the physical address of the current block corresponding to the last record that is stored in the temporary F2H region 830, dChunk represents the flushing number calculated in this step, and Addr(dChunk) represents a delta of physical addresses of the current block corresponding to the flushing number of records of the F2H table. It is to be understood that the calculated result is a physical address corresponding to an actual configuration of a SP, which for example, includes information about a specific SB number, a specific physical page number, a specific section number, etc. Refer to an example as shown in FIG. 8B. The notation B-1 indicates the flushing address that is set to the start address 832 of the temporary F2H region 830, the notation B-2 indicates the calculated flushing number dChunk, and the notation B-3 indicates the calculated physical address 814.

Figure 8C:
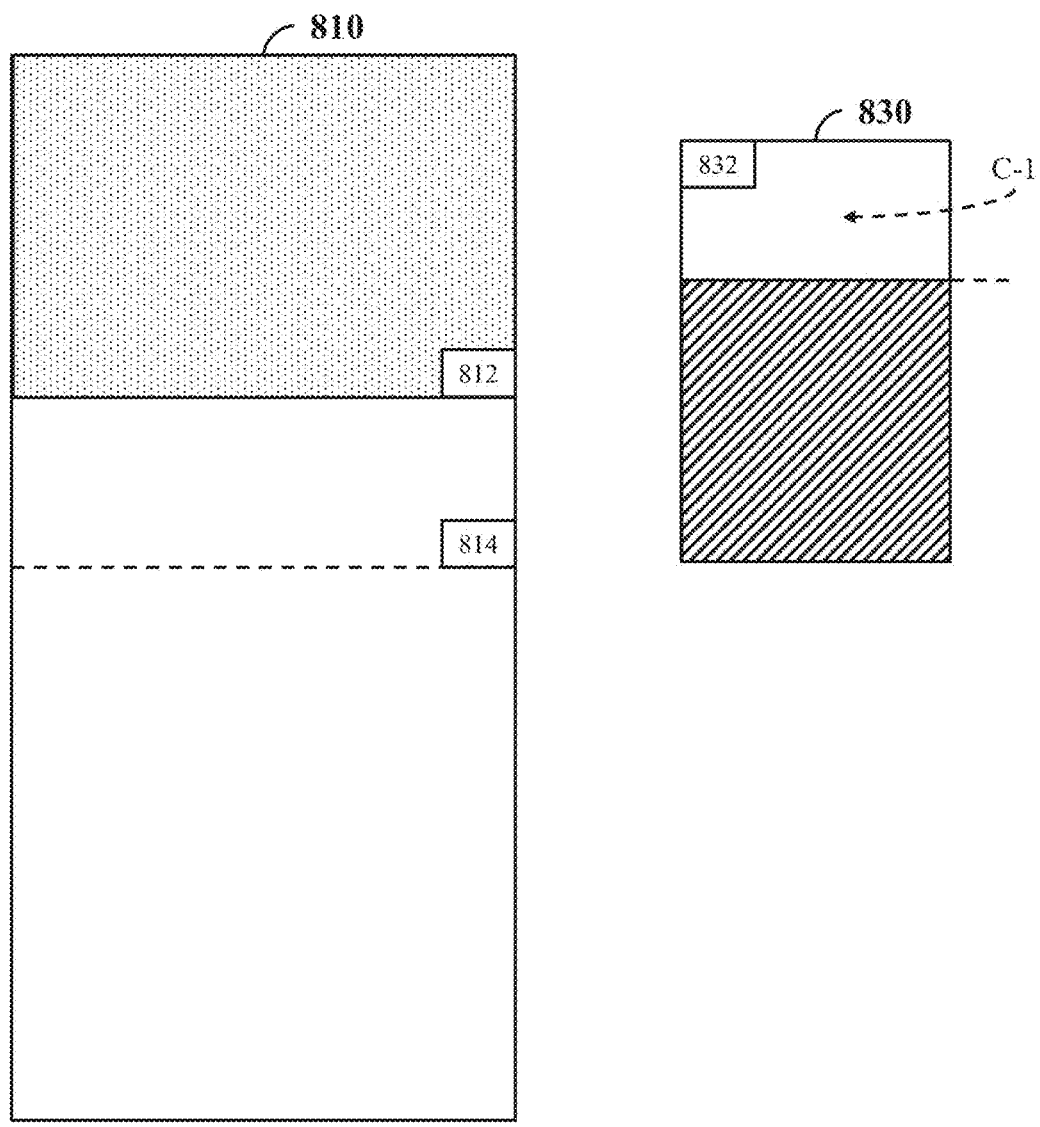

Step S730: Associated H2F sub-tables are updated according to the mapping information in the flushing number of records in the RAM 136 starting from the flushing address. The region of the RAM 136 storing records that have been flushed is referred to as the flushed region. For an example for updating the H2F sub-tables, please refer to the description of FIG. 6. Subsequently, the updated H2F sub-tables are programmed into a designated physical address of the flash module 150 through the flash I/F 139. Refer to an example as shown in FIG. 8C. The notation C-1 indicates the flushed region in the temporary F2H region 830.

Figure 8D:
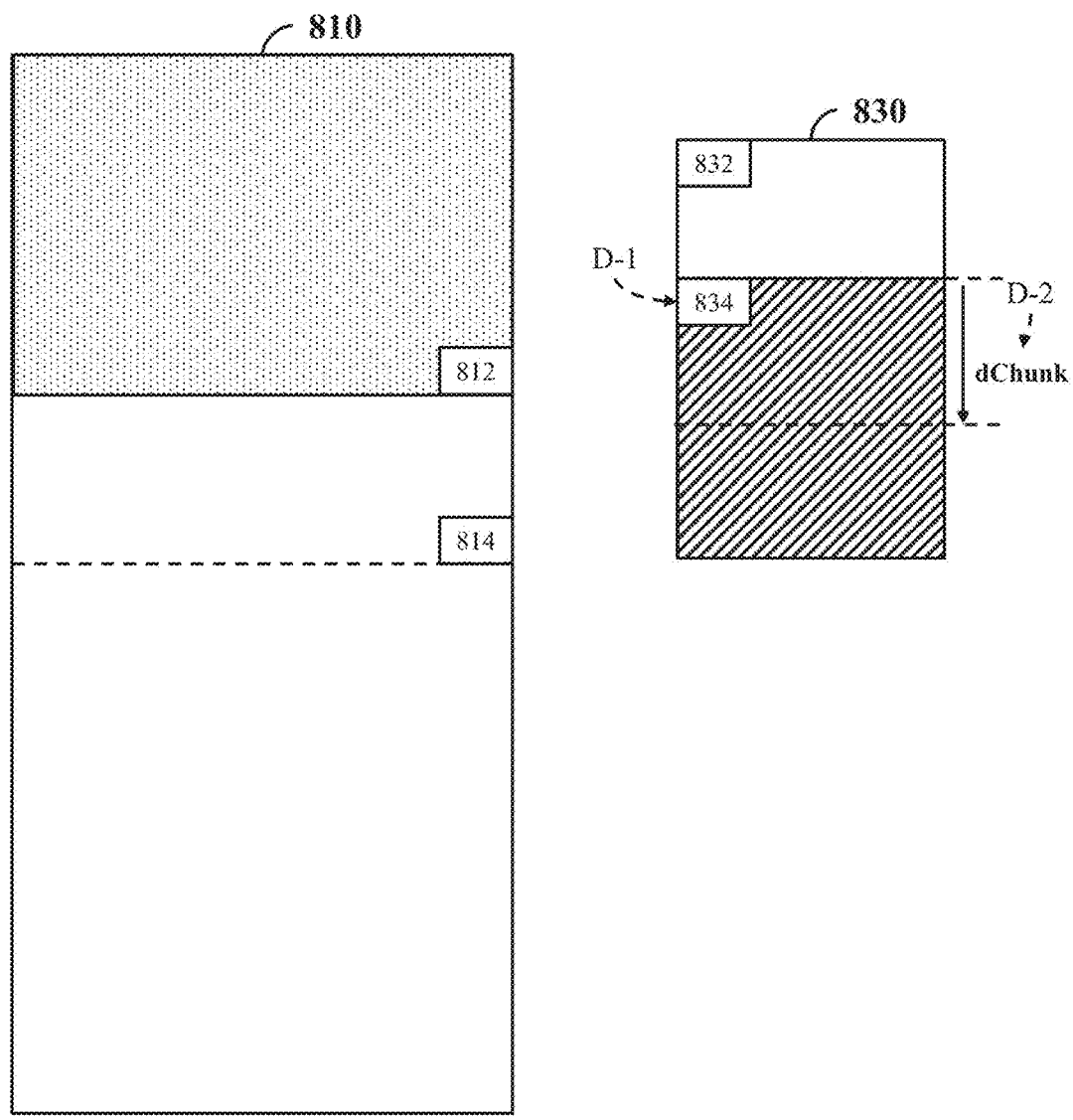

Step S740: The flushing address of the RAM 136 is set to the address next to the last address of the flushed region, and the flushing number is calculated. Technical details for calculating the flushing number may refer to relevant description in step S720. Refer to an example as shown in FIG. 8D. The notation D-1 indicates that the flushing address is set to the address 834 next to the last address of the flushed region, and the notation D-2 indicates the calculated flushing number dChunk.

Subsequently, the processing unit 134 repeatedly executes a loop formed by steps S750 to S780 to refresh the H2F sub-tables multiple times.

Figure 8E:
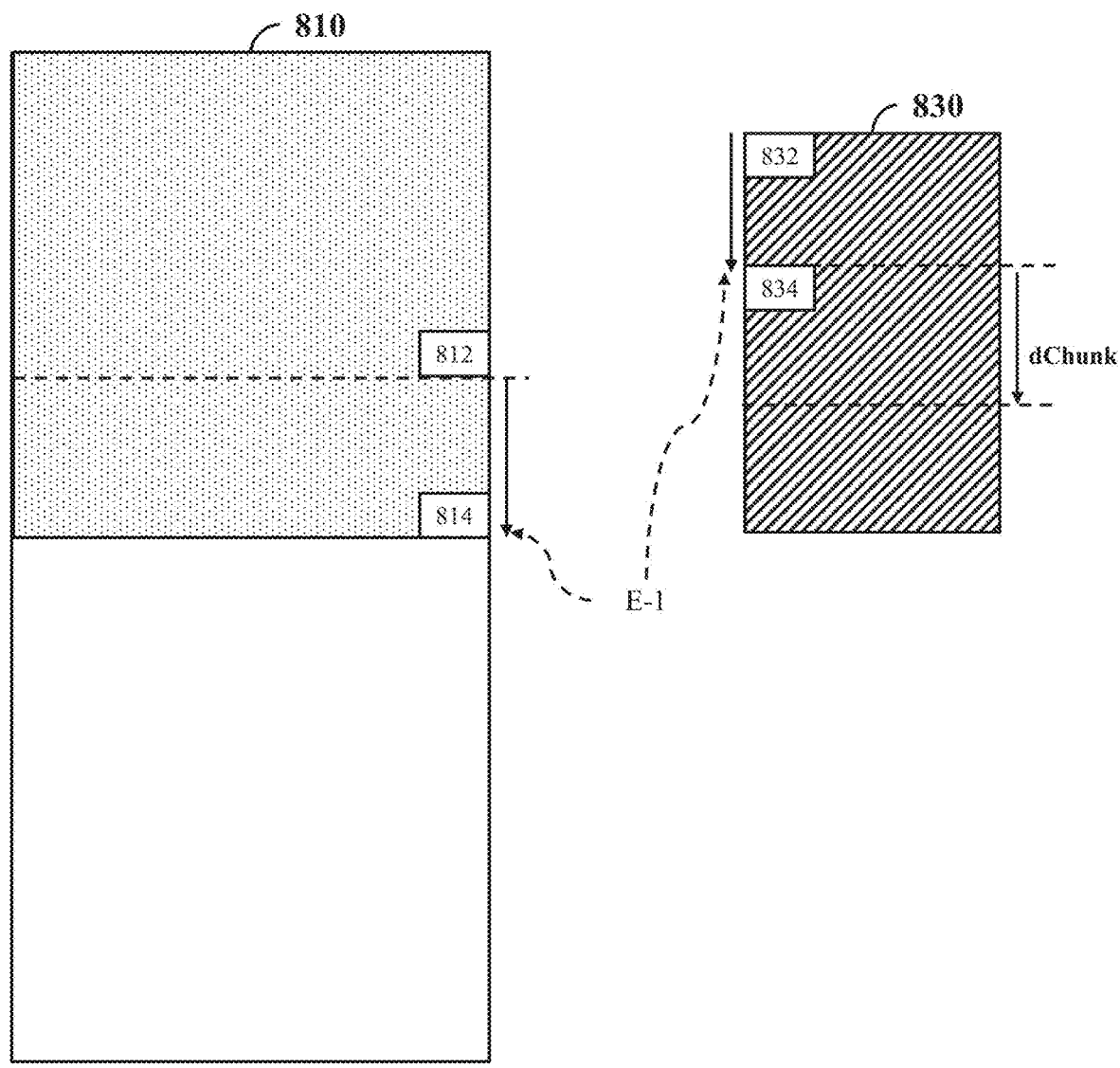

Step S750: User data sent by the host side 110 is programmed through the flash I/F 139 into the flash module 150 starting from the first empty page of the current block to physical address corresponding to the checkpoint, and mapping information about the programming results are sequentially stored in the temporary F2H region of the RAM 136. Refer to an example as shown in FIG. 8E. In the first iteration, as indicated by the notation E-1, the processing unit 134 programs user data into the flash module 150 starting from the physical address next to the physical address 812 of the SB 810 to the physical address 814 of the checkpoint. The flushed region of the temporary F2H region 830 (i.e. the region starting from the address 832 to the address prior to the address 834) as shown in FIG. 8C is filled with the mapping information about the programming results at the checkpoint is entered.

Figure 8F:
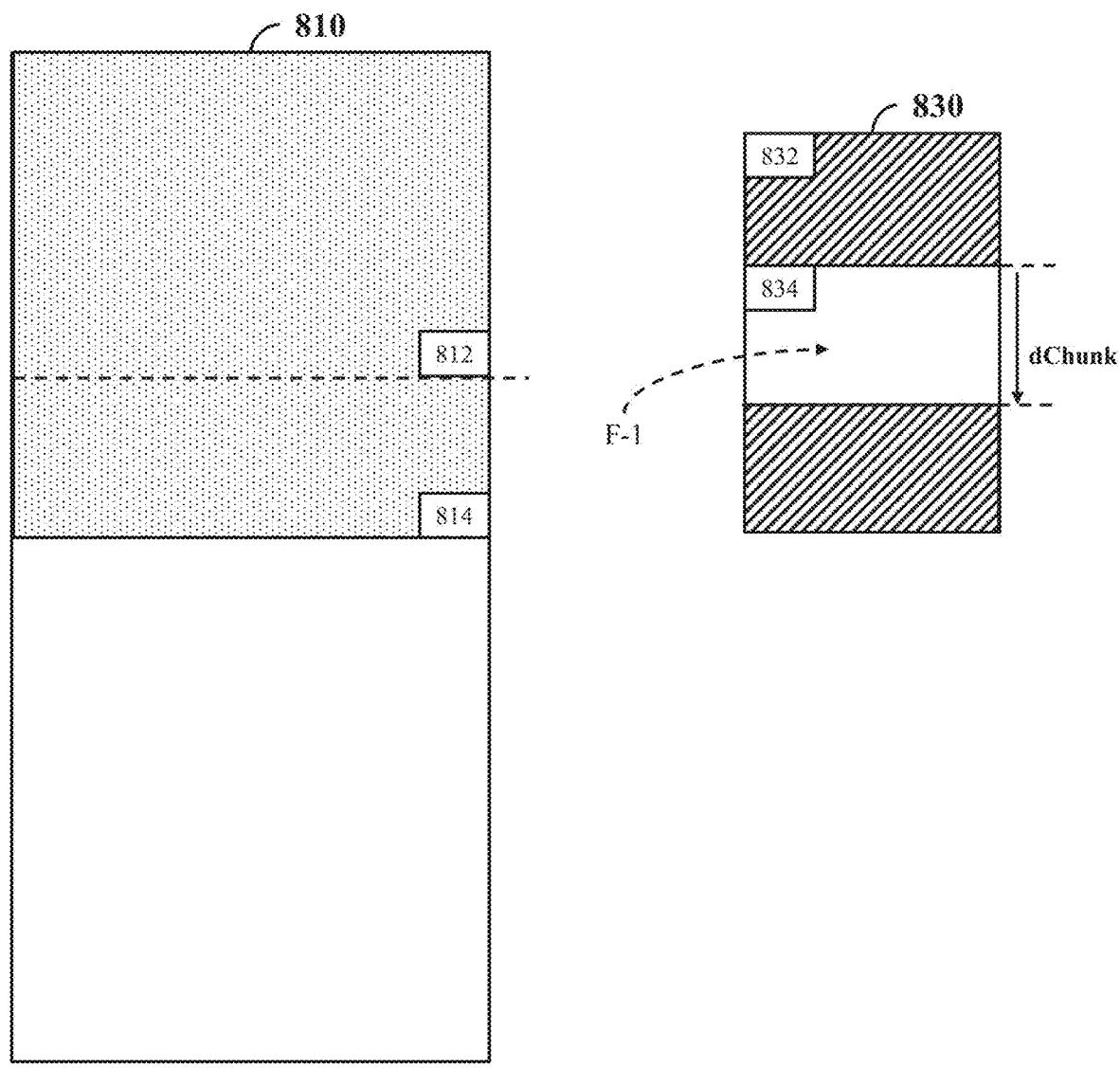

Step S760: Associated H2F sub-tables are updated according to the mapping information in the flushing number of records in the RAM 136 starting from the flushing address, and the updated H2F sub-tables are programmed into a designated physical address of the flash module 150 through the flash I/F 139. For an example for updating the H2F sub-tables, please refer to the description of FIG. 6. Refer to an example as shown in FIG. 8F. In the first iteration, the notation F-1 indicates the flushed region in the temporary F2H region 830.

Step S770: The physical address of the current block corresponding to the checkpoint is updated. The processing unit 134 calculates the physical address of the current block corresponding to the checkpoint by using the following equation:

$$Addr_{CHK} = Addr_{CHK} + Addr(dChunk)$$

$Addr_{CHK}$ on the left side of the equal sign represents the physical address of the current block corresponding to the checkpoint used in the next iteration, $Addr_{CHK}$ on the right side of the equal sign represents the physical address of the current block corresponding to the checkpoint used in the current iteration, dChunk represents the flushing number used in step S760 (which may be calculated in step S740, or step S780 in the previous iteration), and Addr(dChunk) represents a delta of physical addresses of the current block corresponding to the flushing number of records of the F2H table.

Figure 8G:
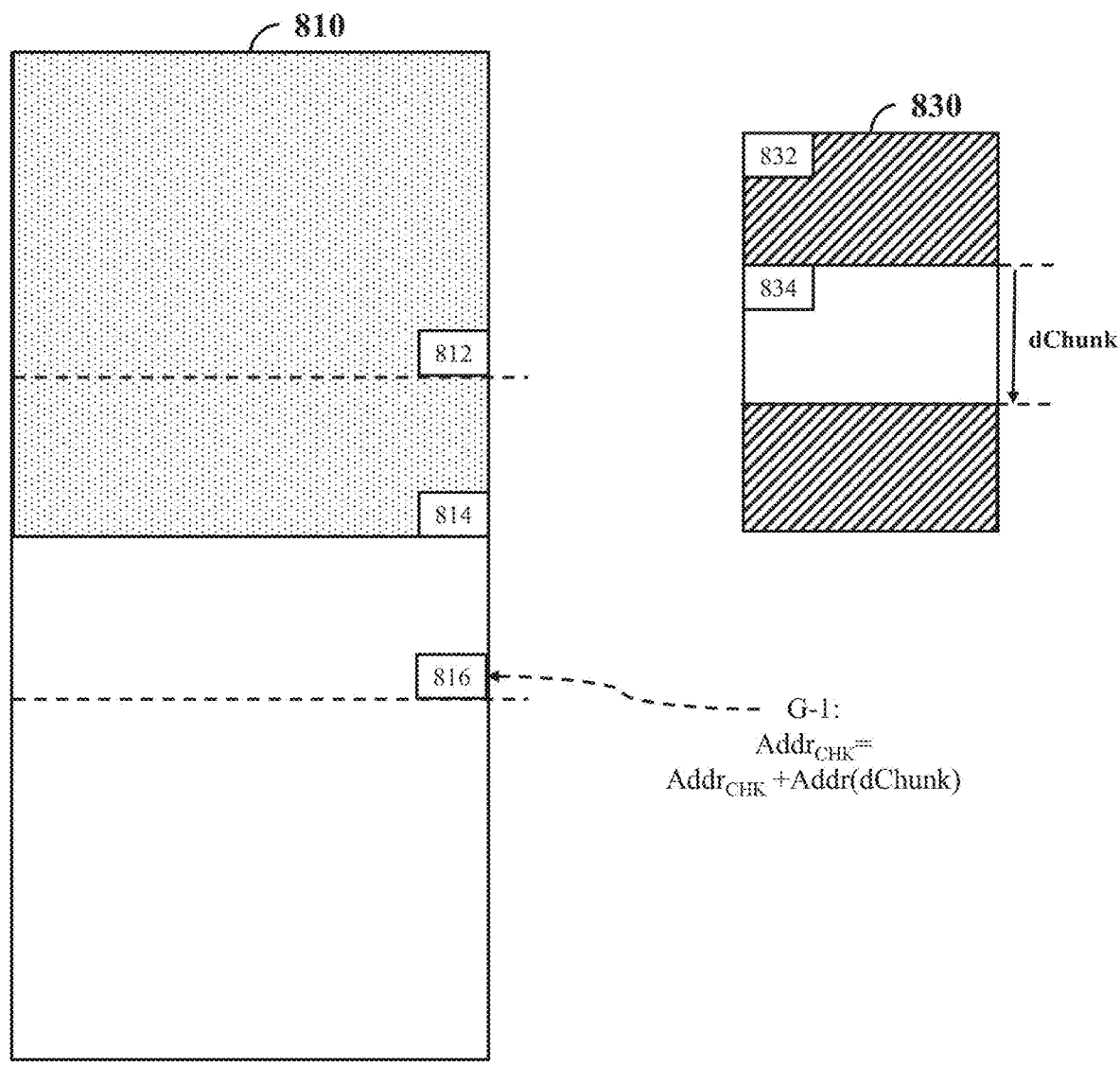

Refer to an example as shown in FIG. 8G. In the first iteration, the notation G-1 indicates the calculated physical address 816. In some embodiments, if the calculated physical address corresponding to the checkpoint exceeds the last physical address of the current block, then the physical address corresponding to the checkpoint is set to the last physical address of the current block.

Figure 8H:
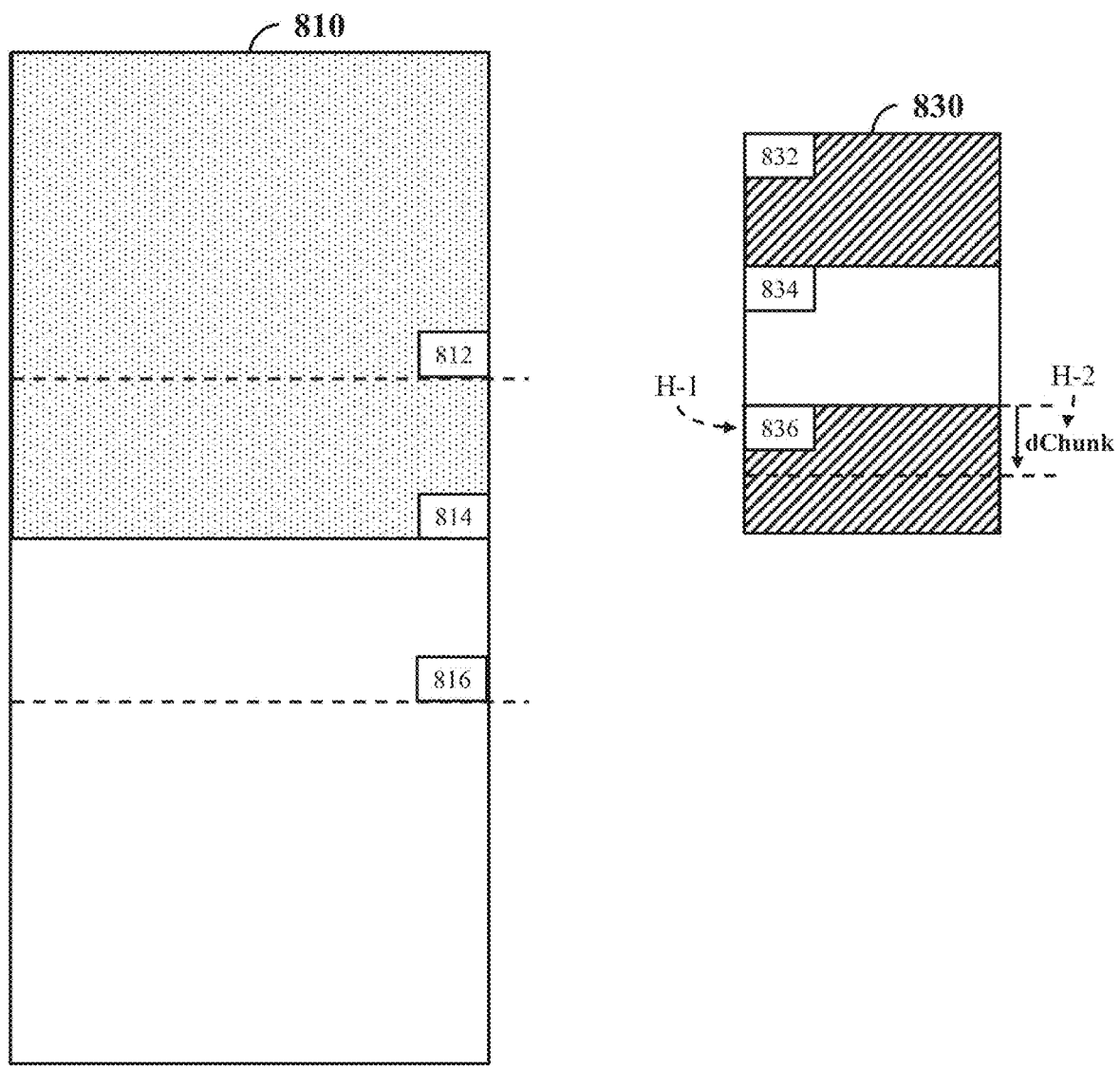

Step S780: The flushing address of the RAM 136 is set to the address next to the last address of the flushed region, and the flushing number is calculated. Technical details for calculating the flushing number may refer to relevant description in step S720. Refer to an example as shown in FIG. 8H. In the first iteration, the notation H-1 indicates that the flushing address is set to the address 836 next to the last address of the flushed region, and the notation H-2 indicates the calculated flushing number dChunk.

Although the invention is illustrated and described herein with reference to specific embodiments, the invention is not intended to be limited to the details shown. Rather, various modifications may be made in the details within the scope and range of equivalents of the claims and without departing from the invention. It is to be understood that the above description is illustrative of the invention and is not to be construed as limiting the invention. Various modifications, applications and/or combinations of the embodiments may occur to those skilled in the art without departing from the scope of the invention as defined by the claims.

One having ordinary skill in the art will readily understand that the invention as discussed above may be practiced with hardware elements in configurations which are different than those which are disclosed. Therefore, although the invention has been described based upon these preferred embodiments, it would be apparent to those skilled in the art that certain modifications, variations, and alternative constructions would be apparent, while remaining within the scope of the invention.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

The term "device" or "module" is not limited to one or a specific number of physical objects (such as one smartphone, one controller, one processing system and so on). As used herein, a device may be any electronic device with one or more parts that may implement at least some portions of the invention in this disclosure. While the description and examples use the term "device" or "module" to describe various aspects of this disclosure, the term "device" or "module" is not limited to a specific configuration, type, or number of objects. Additionally, the term "system" or "module" is not limited to multiple components or specific aspects. For example, a system may be implemented on one or more printed circuit boards or other substrates and may have movable or static components. While the description and examples use the term "system" to describe various aspects of the invention in this disclosure, the term "system" is not limited to a specific configuration, type, or number of objects.

Specific details are provided in the description above to provide a thorough understanding of the aspects and examples provided herein. However, it will be understood by one of ordinary skills in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Some or all of the aforementioned embodiments of the method of the invention may be implemented in a computer program such as a driver for a dedicated hardware, a Firmware Translation Layer (FTL) of a storage device, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier, or may be located in a network server accessible via a network such as the Internet, or any other suitable carrier.

A computer-readable storage medium includes volatile and non-volatile, removable and non-removable media implemented in any method or technology for storage of information such as computer-readable instruction, data structures, program modules, or other data. A computer-readable storage medium includes, but is not limited to, RAM, ROM, EEPROM, flash memory or other memory, CD-ROM, digital versatile disks (DVD), Blue-ray disk or other optical storage, magnetic cassettes, magnetic tape, magnetic disk or other magnetic storage devices, or any other medium which can be used to store the desired information and may be accessed by an instruction execution system. Note that a computer-readable medium can be paper or other suitable medium upon which the program is printed, as the program can be electronically captured via, for instance, optical scanning of the paper or other suitable medium, then compiled, interpreted, or otherwise processed in a suitable manner, if necessary, and then stored in a computer memory.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality.

Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

Although the embodiment has been described as having specific elements in FIGS. 1-3, it should be noted that additional elements may be included to achieve better performance without departing from the spirit of the invention. Each element of FIGS. 1-3 is composed of various circuitries and arranged to operably perform the aforementioned operations. While the process flows described in FIG. 7 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for updating a host-address to flash-address mapping table, performed by a processing unit, comprising:
    allocating a temporary flash-address to host-address mapping (F2H) region in a random access memory (RAM) for storing an F2H table corresponding to a current block, wherein the F2H table comprises a plurality of records arranged in an order of first physical addresses of the current block, and each record stores information indicating which logical address of user data that is mapped by a specific first physical address of the current block;
    setting a quantity of records of the F2H table to be flushed as a flushing number according to information whether available space in a flash module is sufficient, or whether a garbage collection (GC) process is performed while the user data is programmed into the flash module; and
    updating mapping information of a plurality of host-address to flash-address mapping (H2F) sub-tables according to mapping information in the flushing number of records stored in the temporary F2H region, and programming updated H2F sub-tables into a designated physical address of the flash module in response that the user data has been programmed into a second physical address of the current block, which corresponds to a first checkpoint.

2. The method of claim 1, wherein the flushing number is calculated in a previous iteration in a H2F-table flushing procedure, and the updating and the programming for the H2F sub-tables are performed in a current iteration in the H2F-table flushing procedure.

3. The method of claim 2, comprising:
    calculating a third physical address of the current block, which corresponds to a second checkpoint used in a next iteration in the H2F-table flushing procedure, according to the second physical address and the flushing number used in the current iteration.

4. The method of claim 3, wherein the third physical address of the current block is calculated by an equation:

$$Addr_{CHK} = Addr_{CHK} + Addr(dChunk)$$

$Addr_{CHK}$ on a left side of an equal sign represents the third physical address of the current block corresponding to the second checkpoint used in the next iteration, $Addr_{CHK}$ on a right side of the equal sign represents the second physical address of the current block corresponding to the first checkpoint used in the current iteration, dChunk represents the flushing number, and Addr(dChunk) represents a delta of physical addresses of the current block corresponding to the flushing number of records of the F2H table.

5. The method of claim 1, comprising:
    setting the flushing number to a first value in response that the available space in the flash module is insufficient, or the GC process is performed while the user data is programmed into the flash module; and
    setting the flushing number to a second value in response that the available space in the flash module is sufficient, or the GC process is performed while the user data is not programmed into the flash module,
    wherein the first value and the second value are integers greater than 0, and the second value is greater than the first value.

6. The method of claim 5, wherein the first value is a total number of records in the F2H table, which corresponds to n super pages in the current block, the second value is a total number of records in the F2H table, which corresponds to m×n super pages in the current block, n is any integer ranging from 2 to 4, and m is any integer ranging from 32 to 128.

7. The method of claim 6, wherein n is set to any integer ranging from 2 to 4 when the current block is a single level cell (SLC) super block (SB); n is set to 2 or 4 when the current block is a multiple level cell (MLC) SB; n is set to 3 when the current block is a triple level cell (TLC) SB; and n is set to 4 when the current block is a quad-level cell (QLC) SB.

8. A non-transitory computer-readable storage medium having stored therein program code that, when loaded and executed by a processing unit, causes the processing unit to:
    allocate a temporary flash-address to host-address mapping (F2H) region in a random access memory (RAM) for storing an F2H table corresponding to a current block, wherein the F2H table comprises a plurality of records arranged in an order of first physical addresses of the current block, and each record stores information indicating which logical address of user data that is mapped by a specific first physical address of the current block;
    set a quantity of records of the F2H table to be flushed as a flushing number according to information whether available space in a flash module is sufficient, or whether a garbage collection (GC) process is performed while the user data is programmed into the flash module; and
    update mapping information of a plurality of host-address to flash-address mapping (H2F) sub-tables according to mapping information in the flushing number of records stored in the temporary F2H region, and program updated H2F sub-tables into a designated physical address of the flash module in response that the user data has been programmed into a second physical address of the current block, which corresponds to a first checkpoint.

9. The non-transitory computer-readable storage medium of claim 8, wherein the flushing number is calculated in a previous iteration in a H2F-table flushing procedure, and the updating and the programming for the H2F sub-tables are performed in a current iteration in the H2F-table flushing procedure.

10. The non-transitory computer-readable storage medium of claim 9, wherein the program code that, when loaded and executed by the processing unit, causes the processing unit to:
calculate a third physical address of the current block, which corresponds to a second checkpoint used in a next iteration in the H2F-table flushing procedure, according to the second physical address and the flushing number used in the current iteration.

11. The non-transitory computer-readable storage medium of claim 10, wherein the third physical address of the current block is calculated by an equation:

$$Addr_{CHK} = Addr_{CHK} + Addr(dChunk)$$

$Addr_{CHK}$ on a left side of an equal sign represents the third physical address of the current block corresponding to the second checkpoint used in the next iteration, $Addr_{CHK}$ on a right side of the equal sign represents the second physical address of the current block corresponding to the first checkpoint used in the current iteration, dChunk represents the flushing number, and Addr(dChunk) represents a delta of physical addresses of the current block corresponding to the flushing number of records of the F2H table.

12. The non-transitory computer-readable storage medium of claim 8, wherein the program code that, when loaded and executed by the processing unit, causes the processing unit to:
set the flushing number to a first value in response that the available space in the flash module is insufficient, or the GC process is performed while the user data is programmed into the flash module; and
set the flushing number to a second value in response that the available space in the flash module is sufficient, or the GC process is performed while the user data is not programmed into the flash module,
wherein the first value and the second value are integers greater than 0, and the second value is greater than the first value,
wherein the first value is a total number of records in the F2H table, which corresponds to n super pages in the current block, the second value is a total number of records in the F2H table, which corresponds to m×n super pages in the current block, n is any integer ranging from 2 to 4, and m is any integer ranging from 32 to 128.

13. The non-transitory computer-readable storage medium of claim 12, wherein n is set to any integer ranging from 2 to 4 when the current block is a single level cell (SLC) super block (SB); n is set to 2 or 4 when the current block is a multiple level cell (MLC) SB; n is set to 3 when the current block is a triple level cell (TLC) SB; and n is set to 4 when the current block is a quad-level cell (QLC) SB.

14. An apparatus for updating a host-address to flash-address mapping table, comprising:

a random access memory (RAM), arranged operably to allocate a temporary flash-address to host-address mapping (F2H) region for storing an F2H table corresponding to a current block, wherein the F2H table comprises a plurality of records arranged in an order of first physical addresses of the current block, and each record stores information indicating which logical address of user data that is mapped by a specific first physical address of the current block;
a flash interface (I/F), coupled to a flash module; and
a processing unit, coupled to the RAM and the flash I/F, arranged operably to: set a quantity of records of the F2H table to be flushed as a flushing number according to information whether available space in the flash module is sufficient, or whether a garbage collection (GC) process is performed while the user data is programmed into the flash module; and update mapping information of a plurality of host-address to flash-address mapping (H2F) sub-tables according to mapping information in the flushing number of records stored in the temporary F2H region, and program updated H2F sub-tables into a designated physical address of the flash module in response that the user data has been programmed into a second physical address of the current block, which corresponds to a first checkpoint.

15. The apparatus of claim 14, wherein the flushing number is calculated in a previous iteration in a H2F-table flushing procedure, and the updating and the programming for the H2F sub-tables are performed in a current iteration in the H2F-table flushing procedure.

16. The apparatus of claim 15, wherein the processing unit is arranged operably to: calculate a third physical address of the current block, which corresponds to a second checkpoint used in a next iteration in the H2F-table flushing procedure, according to the second physical address and the flushing number used in the current iteration.

17. The apparatus of claim 16, wherein the third physical address of the current block is calculated by an equation:

$$Addr_{CHK} = Addr_{CHK} + Addr(dChunk)$$

$Addr_{CHK}$ on a left side of an equal sign represents the third physical address of the current block corresponding to the second checkpoint used in the next iteration, $Addr_{CHK}$ on a right side of the equal sign represents the second physical address of the current block corresponding to the first checkpoint used in the current iteration, dChunk represents the flushing number, and Addr(dChunk) represents a delta of physical addresses of the current block corresponding to the flushing number of records of the F2H table.

18. The apparatus of claim 14, wherein the processing unit is arranged operably to: set the flushing number to a first value in response that the available space in the flash module is insufficient, or the GC process is performed while the user data is programmed into the flash module; and set the flushing number to a second value in response that the available space in the flash module is sufficient, or the GC process is performed while the user data is not programmed into the flash module, wherein the first value and the second value are integers greater than 0, and the second value is greater than the first value.

19. The apparatus of claim 18, wherein the first value is a total number of records in the F2H table, which corresponds to n super pages in the current block, the second value is a total number of records in the F2H table, which corresponds to m×n super pages in the current block, n is any integer ranging from 2 to 4, and m is any integer ranging from 32 to 128.

20. The apparatus of claim 19, wherein n is set to any integer ranging from 2 to 4 when the current block is a single level cell (SLC) super block (SB); n is set to 2 or 4 when the current block is a multiple level cell (MLC) SB; n is set to 3 when the current block is a triple level cell (TLC) SB; and n is set to 4 when the current block is a quad-level cell (QLC) SB.

* * * * *